United States Patent [19]

Moore

[11] 3,880,712
[45] Apr. 29, 1975

[54] REDUCTION PROCESS

[75] Inventor: Ronald Haywood Moore, MacClesfield, England

[73] Assignee: Imperial Chemical Industries Limited, London, England

[22] Filed: Dec. 26, 1973

[21] Appl. No.: 428,313

[30] Foreign Application Priority Data
Jan. 15, 1973 United Kingdom.............. 2031/73

[52] U.S. Cl..................... 195/51 R; 195/29; 195/30
[51] Int. Cl............................................ C12d 13/00
[58] Field of Search................. 195/51 R, 30, 29

[56] References Cited
UNITED STATES PATENTS 3,595,902  7/1971  Bellet et al....................... 195/51 R
3,799,841  3/1974  Marsheck et al. .................. 195/30

Primary Examiner—Alvin E. Tanenholtz
Attorney, Agent, or Firm—Cushman, Darby & Cushman

[57] ABSTRACT

The disclosure relates to a steroselective microbiological reduction, for example using *Trechispora brinkmannii* (Bresadola) of optically active hydroxy-enone prostaglandin intermediates, for example (3aR,4R,5R,6aS)-4-[4-(3-chlorophenoxy)-3-oxobut-1-trans-enyl]-2,3,3a,6a-tetrahydro-5-hydroxy-2-oxocyclopenteno[b-]furan, to give the optically active form of a known hydroxy-enol prostaglandin intermediate, for example (3aR,4R,5R,6aS)-4-[(3R)-4-(3-chlorophenoxy)-3-hydroxybut-1-trans-envl]-2,3,3a,6a-tetrahydro-5-hydroxy-2-oxocyclopenteno[b]furan.

9 Claims, No Drawings

REDUCTION PROCESS

This invention relates to a reduction process, and in particular it relates to a microbiological reduction process for the manufacture of intermediates for optically active prostaglandins and prostaglandin-like compounds, having the same configuration at C-15 as the naturally occurring prostaglandins.

According to the invention there is provided a reduction process for the manufacture of an optically active prostaglandin intermediate of the formula and absolute sterochemistry.

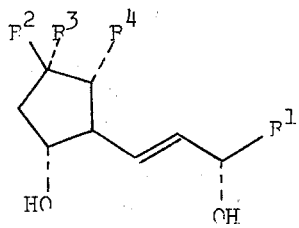
I wherein $R^1$ is:

a branched or unbranched alkyl or alkenyl radical of 4 to 10 carbon atoms; a radical of the formula $-A^1.OR^5$, wherein $A^1$ is an alkylene radical of 1 to 9 carbon atoms and $R^5$ is an alkyl radical of 1 to 9 carbon atoms or a cycloalkyl radical of 5 to 7 carbon atoms, provided that $A^1$ and $R^5$ together contain not more than 10 carbon atoms: a radical of the formula $-A^2R^6$, wherein $A^2$ is a direct bond or an alkylene radical of 1 to 3 carbon atoms, and $R^6$ is an aryl radical which is unsubstituted or which is substituted by halogen atoms, nitro radicals, alkyl, halogenoalkyl, or alkoxy radicals each of 1 to 3 carbon atoms or dialkylamino radicals wherein each alkyl is of 1 to 3 carbon atoms;

a radical of the formula $-A^3.A^4.R^7$, wherein $A^3$ is an alkylene radical of 1 to 3 carbon atoms bearing as substituents 0, 1 or 2 alkyl radicals each of 1 to 3 carbon atoms, $A^4$ is an oxygen or sulphur atom, a sulphinyl radical or an alkylamino radical of up to 4 carbon atoms, and $R^7$ is an aryl, benzyl or furfuryl radical optionally substituted by hydroxy, nitro or phenyl radicals, halogen atoms, alkyl, alkenyl, halogenoalkyl, alkoxy, alkenyloxy, or acylamino radicals of 1 to 4 carbon atoms or dialkylamino wherein each alkyl is of 1 to 3 carbon atoms; or a radical of the formula $-A^3.A^5.R^8$, wherein $A^3$ has the meaning stated above, $A^5$ is an oxygen or sulphur atom, a sulphinyl, sulphonyl, imino or alkylamino radical of up to 4 carbon atoms or a direct bond, or $A^3$ and $A^5$ are each a direct bond, and $R^8$ is an aromatic heterocyclic radical of one or two 5- or 6- membered rings, containing in one ring only, 1 or 2 non-adjacent nitrogen hetero-atoms, and optionally bearing 1 to 3 alkyl radicals or halogen atoms as substituents; and either $R^2$ is a hydrogen atom and $R^3$ and $R^4$ together with the two adjacent ring carbon atoms form a lactone ring of the formula:

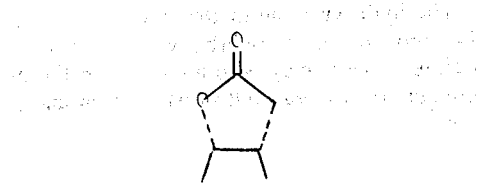

or $R^4$ is a 6-carboxyhexyl or 6-carboxy-2-cis-hexenyl radical bearing 0 or 1 alkyl substituents of 1 to 4 carbon atoms on carbon atom 4, 5 or 6 thereof, $R^2$ is an hydrogen atom and $R^3$ is a hydroxy radical, or $R^2$ and $R^3$ together form the oxo radical;

which comprises culturing a basidiomvcete of the order Aphyllophorales, Agaricales or Dacrvmvcetales, a deuteromvcete of the order Hyphomycetales or a blastomvcete of the order Cryptococcales in the presence of a hydroxyenone of the formula:

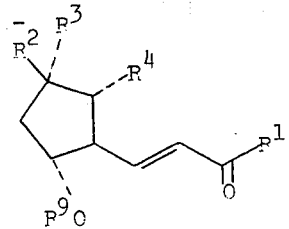
II wherein $R^1$, $R^2$, $R^3$ and $R^4$ have the meanings stated above, and $R^9$ is a hydrogen atom or an alkanoyl radical of up to 10 carbon atoms.

A suitable basidiomvcete of the order Aphyllophorales is one belonging to the family Thelephoraceae, or more particularly one of the genus Trechispoa, which is known alternatively as Sistotrema. Particular members of the genus Trechispora or Sistotrema which may be used in the process of the invention are:

| | |
|---|---|
| *Trechispora brinkmannii*(Bresadola)Rogers and Jackson | — CMI 80,439 |
| *T.niveo-cremea*(Höhnel and Litsch)Boidin | — CBS 427,54 |
| do. | — CBS 428,54 |
| *T. raduloides*(Karst.)Rogers | — CBS 163,65 |
| *Sistotrema brinkmannii*(Bresadola)J.Erikss | — CBS 727,69 |
| do. | — CBS 154,38 |
| do. | — CBS 340,53 |
| do. | — CBS 341,53 |
| do. | — CBS 401,54 |
| do. | — CBS 402,54 |
| do. | — CBS 160,60 |
| do. | — CBS 932,70 |
| *S.oblongisporum* Christiansen and Hauersley | — CBS 397,63 |

The organisms listed above are particularly useful in a process for the manufacture of a prostaglandin intermediate of the formula I, wherein $R^1$ is an alkyl radical of 4 to 10 carbon atoms, particularly a n-pentyl or n-heptyl radical, or a radical of the formula $-A^3.A^4.R^7$ wherein $A^3$ is a methylene radical, $A^4$ is an oxygen atom and $R^7$ is an aryl radical, particularly a 3-chlorophenyl or 3-trifluoromethylphenyl radical, $R^2$ is a hydrogen atom, $R^3$ and $R^4$, together with the two adjacent ring carbon atoms form a lactone ring of the formula:

and $R^9$ is a hydrogen atom.

The organism *T.brinkmannii* has also been described under the name *Phymatotrichum omnivorum*.

A suitable basidiomycete of the order Agaricales is one belonging to the family Agaricaceae, or more particularly one of the genus Lentinellus or the genus Armillariella. Particular organisms of the family Agaricaceae are:

| | |
|---|---|
| *Lentinellus montanus* (O.K.Miller) | — CBS 727,68 |
| *Armillariella mellea* (Vahlex Fries) Quelet | — IMI 180,725 |

*L.montanus* and *A.mellea* are particularly useful in a process of the invention wherein in the starting material of the formula II, $R^1$ is an alkyl radical, particularly a n-phenyl or n-heptyl radical, $R^2$ is a hydrogen atom, $R^3$ and $R^4$ together with the two adjacent ring carbon atoms form a lactone ring of the formula:

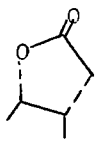

and $R^9$ is a hydrogen atom, and *A.mellea* is also useful in a process of the invention using a starting material of the formula II wherein $R^1$ is a radical of the formula $—A^3.A^4.R^7$ as described above in connection with Trechispora species.

A suitable basidiomycete of the order Dacrymycetales is one belonging to the family Dacrymycetaceae or more particularly one of the genus Femsjonia. A particular preferred organism of this group is:

| | |
|---|---|
| *Femsjonia luteo-alba* Fr. | — CBS 209,48 |

A suitable deuteromvce of the order Hyphomvcetales is one belonging to the family Dematicacae or more particularly, one of the genus Helicomyces or Ceratosporella. Particular preferred organisms of this group are:

| | |
|---|---|
| *Helicomyces roseus* Link | — CBS 283,51 |
| *Ceratosporella goidanichii* Pambelli | — CBS 136,58 |

A suitable deuteromycete of the order Cryptoccocales is one belonging to the family Cryptococcaceae or more particularly one of the genus Brettanomyces. A particular preferred organism of this group is:

| | |
|---|---|
| *Brettanomyces bruxellensis*(Kuff and v.Laer) | — CBS 78 |

*F. luteo-alba*, *H. roseus*, *C. goidanichii* and *B.bruxellensis* are particularly useful in a process of the invention using a starting material of the formula II wherein $R^1$ is a radical $—A^3.A^4.R^7$ as described above in connection with Trechispora (Sistotrema) species, and B.bruxellensis is also useful in a process using a starting material wherein $R^1$ is an alkyl radical as described above in connection with Trechispora species.

All the organisms identified above by a CMI or IMI reference number are freely available from The Commonwealth Mycological Institute, Kew, Surrey, England, and the organisms identified above by CBS reference numbers are freely available from Centraal Bureau Voor Schimmel Cultures, Baarn, Netherlands.

The organisms referred to above are classified according to "Ainsworth and Bisby's Dictionary of the Fungi" by G. C. Ainsworth, P. W. James and D. L. Hawksworth, 6th Edition, 1971, published by the Commonwealth Mycological Institute.

The organism used in the process of the invention may be cultured in conventional manner, using a conventional medium. The organism is preferably cultured in a submerged suspension in an aqueous medium which includes a carbon source, for example dextrose monohydrate at 0.1 to 5% w/v, a nitrogen source, for example ammonium tartrate at 0.1 to 1.0% w/v and/or yeast extract at 0.02 to 0.3% w/v, a magnesium source, for example magnesium sulphate heptahydrate at 0.01 to 0.2% w/v, a sulphur source, for example the sulphate referred to above, a phosphorus source, for example potassium dihydrogen phosphate at 0.001–0.5% w/v, and a potassium source, for example the phosphate referred to above, and traces of salts containing metals, for example salts of iron, for example ferrous sulphate hepta-hydrate (up to 10 p.p.m.), copper, for example copper sulphate pentahydrate (up to 5 p.p.m.), zinc, for example zinc sulphate heptahydrate (up to 10 p.p.m.), manganese, for example manganese sulphate tetrahydrate (up to 5 p.p.m.), and molybdenum, for example potassium molybdate (up to 5 p.p.m.). The fermentation may conveniently be carried out at a temperature between 15° and 35°C., preferably 25° to 28°C.

The hydroxyenone of the formula II wherein $R^2$ is hydrogen, and $R^3$ and $R^4$ together with the adjacent carbon atoms form a lactone ring, may be obtained by the following sequence of reactions:

7-Syn-dimethoxymethylbicyclo[2,2,1]hept-2-en-5-one (III) is reduced to the corresponding alcohol IV, which is esterified with phthalic acid to give the hemi-phthalate V. Reaction of the hemi-phthalate V with (-)-amphetamine results in the crystallisation of the optically-active (-)-amphetamine salt which is hydrolysed to the optically-active hemi-phthalate VI (All subsequent intermediates in this sequence are of course optically active). The hemi-phthalate VI is hydrolysed to the alcohol VII, which is oxidised with Jones' reagent to the ketone VIII. Baeyer-Villiger oxidation gives the lactone IX which is rearranged with potassium tri-iodide to the iodohydrin X. The iodohydrin X is protected as the 4-phenylbenzoate ester XI ($R^{10}$ = 4-phenylbenzoyl), and the iodine is removed with tributyl tin hydride to give the de-iodinated lactone XII which is hydrolysed to the aldehyde XIII. The aldehyde XIII is reacted with a phosphonate reagent of the formula $(CH_3O)_2PO.CH_2COR^1$ in the presence of a strong base to give the protected enone XIV which is then reduced to the protected enol XV. The protecting 4-phenylbenzoyl group is removed by hydrolysis, and the resulting diol XVI is oxidised with manganese dioxide to the required hydroxy-enone starting material II.

The hydroxyenone of the formula II wherein $R^4$ is a 6-carboxyhexyl of 6-carboxy-2-cis-hexenyl radical as defined above, may be obtained from the mixed C-15 epimers of the required prostaglandin and prostaglandin

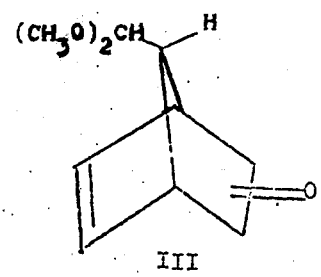
III
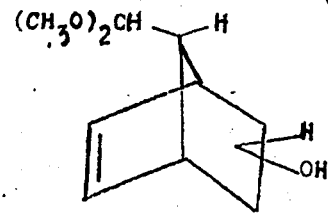
IV
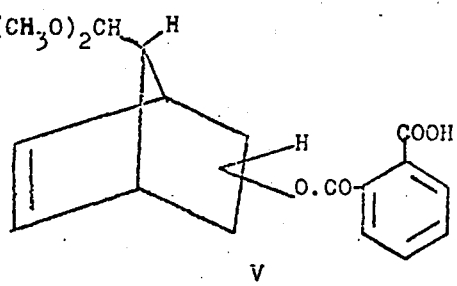
V
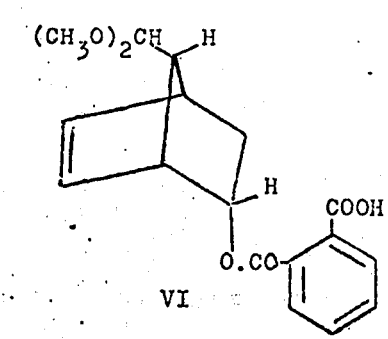
VI
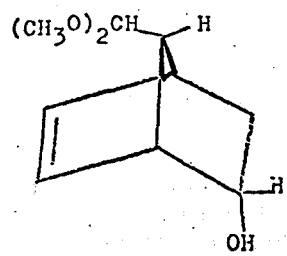
VII
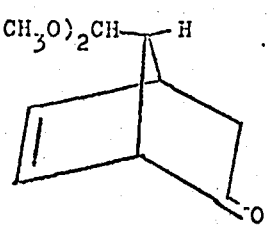
VIII
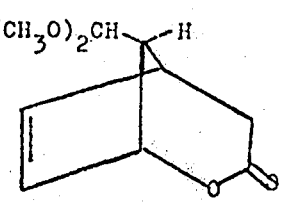
IX
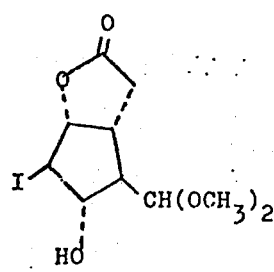
X
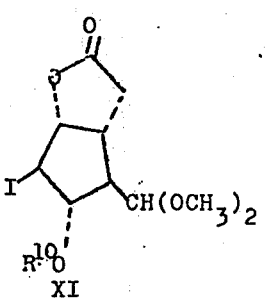
XI
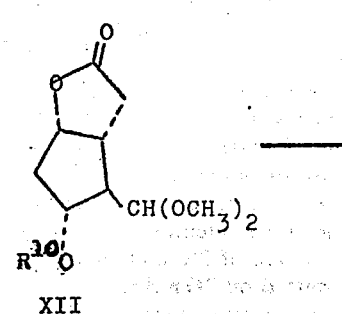
XII
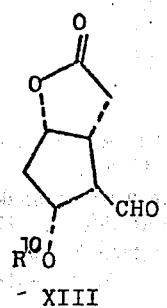
XIII

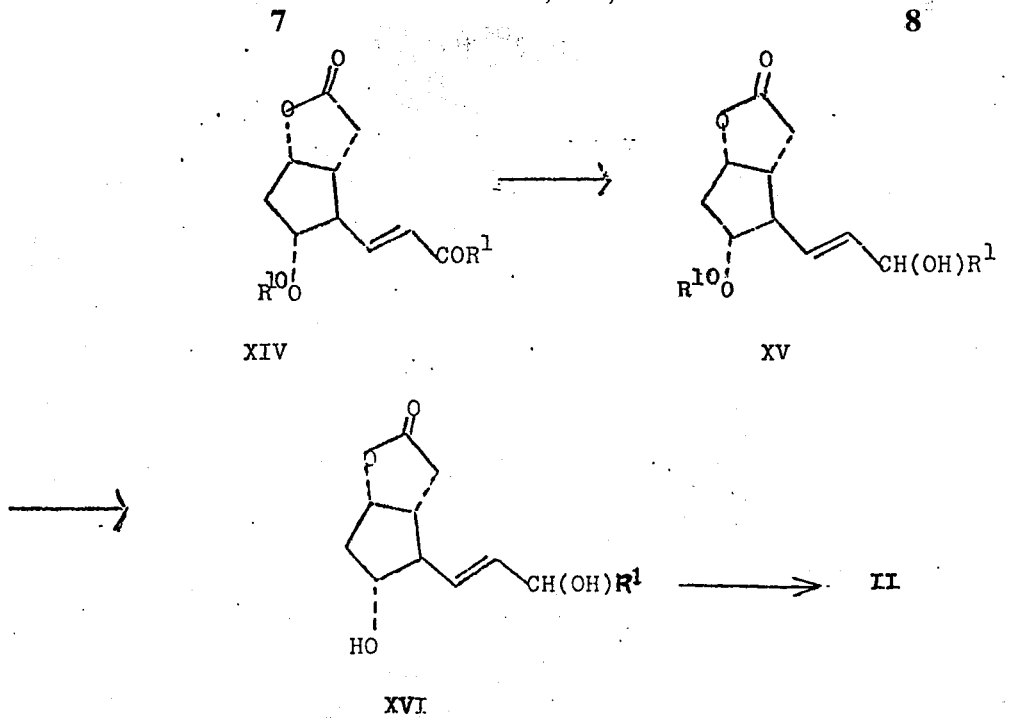

like compond by oxidation thereof, for example with 2,3-dichloro-5,6-dicyano-1,4-benzoquinone.

The invention is illustrated but not limited by the following Examples:

EXAMPLE 1

An agar slant of 45 ml. of nutrient medium was prepared comprising:

Potato extract (from 200g. peeled and chopped potatoes boiled in 1 l. of deionised water for 20 minutes, then strained)

| | |
|---|---|
| Dextrose | 20g. |
| Agar (Oxoid No.3) | 20g. |
| Deionised water | to 1 l. | and was sterilised for 20 minutes at 15 p.s.i. The medium was inoculated with *Trechispora brinkmannii* and incubated at 25°C. for 8 days.

The whole surface culture of the organism was suspended in 2 ml. of deionised water, and added to a 500 ml. conical flask containing 200 ml. of the following medium:

| | |
|---|---|
| Dextrose monohydrate | 10g. |
| Ammonium tartrate | 2g. |
| Yeast extract | 1g. |
| $KH_2PO_4$ | 1g. |
| $MgSO_4.7H_2O$ | 0.5g. |
| $FeSO_4.7H_2O$ | 1.0mg. |
| $CuSO_4.5H_2O$ | 0.15mg. |
| $ZnSO_4.7H_2O$ | 1.0mg. |
| $MnSO_4.4H_2O$ | 0.1mg. |
| $K_2MoO_4$ | 0.1mg. |
| Deionised water | to 1 l. |

Adjusted to pH 5.5 with 10N sodium hydroxide, and sterilised for 20 minutes at 15 p.s.i.

The flask was agitated on a rotary shaker (250 cycles/minute, 1 inch radius) at 25°C. for 72 hours then 2ml. of the culture was transferred to a sterile 4 × inch test-tube. (3aR, 4R, 5R, 6aS)-2,3,3a, 6a-Tetrahydro-5-hydroxy-2-oxo-4-(3-oxodec-1-trans-enyl)cyclopenteno[b] furan (400µg.) was added as 5µl. of an 80mg./ml. solution in ethanol, and the tube was agitated on a rotary shaker (200 cycles/minute, 0.75 inch radius) at 25°C. for 20 hours. The culture was then adjusted to a pH of about 2.5 by addition of 0.5ml. of a 20% solution of citric acid in water, and the whole mixture was extracted with ethyl acetate (1ml.). The solution contained (3aR, 4R, 5R, 6aS)-2,3,3a, 6a-tetrahydro-5-hydroxy-4-[(3S)-3-hydroxydec-1-trans-enyl]-2-oxocyclopenteno[b] furan, identical except for optical activity with authentic racemic material by the following criteria:

a. thin layer chromatography. A sample of 100µl. of the ethyl acetate solution was applied to a 0.25mm layer of Kieselgel-F254, and the plate was developed with ethyl acetate. Comparison with authentic racemic material demonstrated the same $R_F$ value (0.19), and the same colour reaction on spraying the plate with a solution of vanillin (1g.) in 100 ml. of a mixture of equal parts of ethanol, water and phosphoric acid (s.g. = 1.75), and subsequent heating;

b. vapour phase chromatography. The remaining ethyl acetate solution was applied to a similar silica gel plate as a 5cm. wide band, and the plate was developed as in (a) above. The band corresponding to the product was removed from the plate, and the product eluted therefrom with methanol. The eluate was evaporated to dryness and the residue was dissolved in ethyl acetate (0.5ml.). A 200µl. sample of this solution was evaporated to dryness, and the residue was treated with bis-triethylsilyl-trifluoroacetamide containing 1% of trimethylchlorosilane, to give the bistrimethylsilyl derivative. This derivative was shown to be identical except for optical activity with the bis-trimethylsilyl derivative of authentic racemic material by:

i. identical retention times of 10.4 minutes on a 5ft. column of 2% methyl vinyl silicone SE-33 supported on "Gaschrom A" (85–100 mesh) at an oven temperature of 220°C. and a nitrogen flow rate of about 50 ml/minute.

ii. identical retention times of 7.4 minutes on a 5ft. long column of 2% methyl silicone OV-1 supported on Gas Chrom Q (80–100 mesh) at an oven temperature of 220°C. at a helium flow rate of 30 ml./minute;

c. mass spectrum. The mass spectrum of the peak from the OV-1 column was identical with that of authentic racemic bis-trimethylsilyl derivative ($M^+$ = 440).

EXAMPLE 2

The reduction in Example 1 was carried out with *Brettanomyces bruxellensis* following the procedure described in Example 1 except that the agar slant consisted of nutrient medium comprising:

| | |
|---|---|
| Malt | 20g. |
| Yeast extract | 0.1g. |
| Agar (Oxoid No.3) | 20g. |
| Deionised water | to 1 l. | adjusted to pH 5.5 with sodium hydroxide before sterilisation. The agar slant was incubated for 10 days; five test tube cultures were prepared and incubated for 24 hours; and the ethyl acetate extracts from these tubes were combined. The extract was shown to contain (3aR, 4R, 5R, 6aS)-2,3,3a, 6a-tetrahydro-5-hydroxy-4-[(3S)-3-hydroxvdec-1-trans-enyl]-2-oxocyclopenteno[b] furan identical except for optical activity with authentic racemic material by the criterion of Example 1, except that the thin layer plate was sprayed with a solution of ceric sulphate (3g.) in 100 ml. of 3N-sulphuric acid.

EXAMPLE 3

An agar slant prepared as in Example 2 was inoculated with *Lentinellus montanus* and incubated at 25°C. for 12 days.

The whole surface culture of the organism was suspended in 10ml of the dextrose and ammonium tartrate containing medium described in Example 1, and 2ml. of this suspension was transferred to a sterile 4 × inch test-tube. The tube was agitated on a rotary shaker (200 cycles/minute, 0.75 inch radius) at 25°C. for 48 hours. (3aR, 4R, 5R, 6aS)-2,3,3a, 6a-tetrahydro-5-hydroxy-2-oxo-4-(3-oxodec-1-transenyl)cyclopenteno[b] furan (100μg.) was added as 0.1ml. of a 1mg./ml. solution in a mixture of ethanol (1 volume) and 0.5% aqueous "Tween" 20 (4 volumes), and the tube was agitated for a further 48 hours. The culture was then extracted with ethyl acetate (1ml.). The solution contained (3aR, 4R, 5R, 6aS)-2,3,3a,6a-tetrahydro-5-hydroxy-4-[(3S)-3-hydroxy-dec-1-transenyl]-2-oxocyclopenteno[b] furan identical except for optical activity with authentic racemic material by the following criteria:

a. thin layer chroatography. A saple of 200μl. of the ethyl acetate solution was applied to a 0.25ml. layer of Kieselgel-F254 impregnated with silver nitrate, prepared by dipping the plate in a 5% solution of silver nitrate in a mixture of ethanol (4 volumes) and water (1 volume), and the plate was developed twice with ethyl acetate. Comparison with authentic racemic material demonstrated the same $R_F$ value (0.27) and the same colour reaction on spraying the plate with a solution of ceric sulphate (3g.) in 100ml. of 3N-sulphuric acid, and subsequent heating.

b. Vapour phase chromatography. A portion of the ethyl acetate extract was evaporated to dryness and the trimethylsilyl derivative was prepared as in Example 1. This was identical except for optical activity with authentic racemic material by vapour phase chromatography on the systems described in Example 1.

c. Mass Spectrum. The mass spectrum of the peak from the OV-1column was identical with that of authentic racemic bis-trimethysilyl derivative ($M^+$ = 440) as obtained in Example 1.

EXAMPLE 4

The process described in Example 3 was repeated, using *Armillariella mellea* in place of L.montanus, except that the enone starting material (400μg.) was added as 5μl. of an 80 mg./ml. solution in ethanol, and that the test tube culture was extracted twice with ethyl acetate (1ml.). The combined extract was evaporated to dryness and redissolved in ethyl acetate (1ml.). The solution was shown to contain (3aR, 4R, 5P, 6aS)-2,3,3a, 6a-tetrahydro-5-hydroxy-4-[(3S)-3-hydroxydec-1-trans-ethyl]-2-oxocyclopenteno[b]furan, identical except for optical activity with authentic racemic material, as shown by thin layer chromatography of 100μl. aliquots on 0.25mm. layers of Kieselgel-F254, and on Kieselgel-F254 impregnated with silver nitrate, as described in Example 3. Plates were run three times in ethyl acetate and sprayed with ceric sulphate as in Example 3.

EXAMPLE 5

A culture of Trechispora brinkmannii in a 500ml. conical flask was prepared as described in Example 1. The culture was shaken at 25°C. for 17 days. Mycelium from a 20ml. aliquot was then transferred to a 100ml. conical flask containing (3aR, 4R, 5R, 6aS)-4-[4-(3-chlorophenoxy)-3-oxobut-1-trans-enyl]-2,3,3a, 6a-tetrahydro-5-hydroxy-2-oxocyclopenteno[b]furan (2mg.) and the whole was resuspended in 20 ml. of the same nutrient medium. The flask was shaken in the same manner for 120 hours. The whole culture was then extracted twice with an equal volume of ethyl acetate. The combined extracts were shown to contain (3aR, 4R, 5R, 6aS)-4-[(3R)-4-(3-chlorophenoxy)-3-hydroxybut-1-trans-enyl]-2,3,3a,6a-tetrahydro-5-hydroxy-2-oxocyclopenteno[b]furan, identical except for optical activity with authentic racemic material by the following criteria:

a. thin layer chrommatography. Samples (400μl.) contained material identical in $R_F$ value and colour reaction when applied to a 0.25 mm. layer of Kieselgel F254, and the plate run three times in ethyl acetate and sprayed with vanillin reagent (Example 1); and when applied to a 0.25mm. layer of Kieselgel-F254 impregnated with silver nitrate by dipping in a 10% solution of silver nitrate in ethanol (4 volumes) and water (1volume), the plate run three times in ethyl acetate and sprayed with ceric sulphate reagent (Example 3);

b. vapour phase chromatography. A 200μl. sample was evaporated to dryness and the trimethylsilyl derivative was prepared as described in Example 1. The sample was shown to be identical with the bis-trimethylsilyl derivative of authentic racemic material by:

i. identical retention tie of 15 minutes on a 5ft. long column of 2% methyl vinyl silicone SE-33 supported on "Gas Chrom A" (85–100 mesh) at an oven temperature of 230°C. and a nitrogen flow rate of about 50ml./minute.

ii. identical retention time of 15.6 minutes on a 5 ft. long column of 2% methyl silicone OV-1 supported on "Gas Chrom Q" (80–100 mesh) at an oven temperature of 220°C. and a helium flow rate of 30ml./minute;

c. mass spectrum. The mass spectrum of the peak from the OV-1 column was identical with that of authentic racemic bis-trimethylsilyl derivatives ($M^+ = 482$).

EXAMPLE 6

The process described in Example 5 was repeated, using *Armillariella mellea* in place of *T. brinkannii*, except that the enone starting material (400 μg.) was added as 10μl. of a 40mg./ml. solution in ethanol. The product obtained was identical except for optical activity with authentic racemic material by the criteria described in Example 5.

EXAMPLE 7

The process described in Example 5 was repeated, using *Sistotrema brinkmannii* (CBS 727,69) in place of *T.brinkmannii*. A malt agar slant, prepared as described in Example 2, was inoculated and incubated for approximately 15 days. The whole surface culture was suspended in 10ml. of the dextrose ammonium tartrate medium described in Example 1, and 2ml. were transferred to a test tube as described in Example 3. After 3 days, (3aR, 4R, 5R, 6aS)-4-[4-(3-chlorophenoxy)-3-oxobut-1-transenyl]-2,3,3a,6a-tetrahydro-5-hydroxy-2-oxocyclopenteno[b]furan (200μg.) was added as 0.1ml. of a 2mg./ml. solution in a mixture of ethanol (2 volumes) and 0.5% aqueous solution of "Tween" 20 (trade mark), (3.4 volumes). The tube was agitated for a further 3 days. The culture was then extracted with ethyl acetate (1ml.). The solution contained (3aR, 4R, 5R, 6aS)-4-[(3R)-4-(3-chlorophenoxy)-3-hydroxybut-1-trans-enyl]-2,3,3a, 6a -tetrahydro-5-hydroxy-2-oxocyclopenteno[b]furan, identical except for optical activity with authentic racemic material by the following criteria:

a. thin layer chromatography of 100μl. samples on Kieselgel-F254, and on silver nitrate impregnated Kieselgel-F254 as described in Example 5;

b. vapour phase chroatography of the trimethylsilyl derivative of a 100μl. sample, prepared as described in Example 1, and chromatographed on the SE-33 column described in Example 5.

EXAMPLE 8

The process described in Example 7 was repeated five times, using respectively *Helicomyces roseus*, *Sistotrema brinkmannii* strains CBS 154,38, CBS 341,53, and CBS 932,70, and *Sistotrema oblongisporum*, except that the enone starting material (200μg.) was added as 0.1ml. of a 2mg./ml. solution in ethanol (2 volumes) and 0,5% aqueous "Tween" 20 (2.6 volumes) after 2 days incubation of the test-tube cultures, and the cultures were extracted after a further 2 days. The extracts contained (3aR, 4R, 5R, 6aS)-4-[(3R)-4-(3-chlorophenoxy)-3-hydroxybut-1-trans-enyl]-2,3,3a, 6a-tetrahydro-5-hydroxy-2-oxocyclopenteno[b]furan, as shown by the criteria of Example 7, except that 200μl. samples were applied to the silver nitrate impregnated KieselgelF254 plates.

The surface cultures of *S.brinkmanni* CBS 154,38 and CBS 341,53 were grown on the potato-dextrose agar described in Example 1; *S.brinkmannii* CBS 932,70 and S.oblongisporum were grown on the melt agar described in Example 2; *Helicomyces roseus* was grown on an agar slant comprising:

| | |
|---|---|
| Sucrose | 30g. |
| NaNO$_3$ | 3g. |
| K$_2$HPO$_4$ | 1g. |
| MgSO$_4$.7H$_2$O | 0.5g. |
| KCl | 0.5g. |
| Cornsteep liquor | 10g. |
| FeSO$_4$.7H$_2$O | 1.0mg. |
| CuSO$_4$.5H$_2$O | 0.15mg. |
| ZnSO$_4$.7H$_2$O | 1.0mg. |
| MnSO$_4$.4H$_2$O | 0.1mg. |
| K$_2$MoO$_4$ | 0.1mg. |
| Agar | 15g. |
| Deionised water | to 1 l. |

Adjusted to pH 7 with sodium hydroxide solution before sterilisation.

EXAMPLE 9

The process described in Example 8 was repeated three times, using respectively *Sistotrema brinkmannii* strains CBS 340,53; CBS 160,60; and CBS 401,54; except that the enone starting material was added as 0.1ml. of a 2mg./ml. solution in ethanol (1 volume) and 0.5% aqueous "Tween" 20 (4 volumes).

The extracts contained (3aR, 4R, 5R, 6aS)-4-[(3R)-4-(3-chlorophenoxy)-3-hydroxybut-1-trans-enyl]-2,3,3a, 6a-tetrahydro-5-hydroxy-2-oxocyclopenteno[b]furan, shown by the same criteria as described in Example 8.

The surface cultures used were grown on the potato-dextrose agar described in Example 1.

EXAMPLE 10

The process described in Example 7 was repeated three times using respectively *Brettanomyces bruxellensis*, *Femsjonia luteo-alba*, and *Sistotrema brinkannii* (CBS 402,54) as described, except that enone starting material (250 μg.) was added as 50μl. of a 5mg./ml. solution in ethanol, and the cultures were extracted twice with ethyl acetate (1ml.).

The extracts contained (3aR, 4R, 5R, 6aS)-4-[(3R)-4-3-(chlorophenoxy)-3-hydroxybut-1-trans-enyl]-2,3,3a, 6a-tetrahydro-5-hydroxy-2-oxocyclopenteno[b]furan, as shown by the criteria described in Example 7, except that 200μl. samples were applied to Kieselgel-F254 plates, and 300μl. were applied to Kieselgel-F254 plates impregnated with silver nitrate prepared as described in Example 5; and 200μl. samples were used for preparation of trimethylsilyl derivatives for vapour phase chromatography.

EXAMPLE 11

The process described in Example 8 was repeated four times, using respectively *Trechispora niveo-cremea* (CBS 427,54 and CBS 428,54) *Trechisopora raduloides* and *Ceratosporella goidanichii* as described, except that the enone starting material was added as described in Example 9.

The product extract contained (3aR, 4R, 5R, 6aS)-4-[(3R)-4-(3-chlorophenoxy)-3-hydroxybut-1-trans-enyl]-2,3,3a, 6a-tetrahydro-5-hydroxy-2-oxocyclopenteno[b]furan, as shown by the criteria that it was identical to authentic racemic aterial on thin layer chromatography of a 100μl. sample on a Kieselgel-F254 plate run three times in ethyl acetate and sprayed with the vanillin reagent; (Example 1), and on vapour phase chromatography as the bis-trimethylsilyl derivative on the SE-33column as described in Example 5.

EXAMPLE 12

The process described in Example 5 was repeated using (3aR, 4R, 5R, 6aS)-2,3,3a, 6a-tetrahydro-5-hydroxy-2-oxo-4-[3-oxo-4-(3-trifluoromethylphenoxy)but-1-trans-enyl]cyclopenteno[b]furan in place of (3aR, 4R, 5R, 6aS)-4-[4-(3-chlorophenoxy)-3-hydroxybut-1-trans-enyl]-2,3,3a, 6a-tetrahydro-5-hydroxy-2-oxocyclopenteno [b]furan. The extract obtained was shown to contain (3aR, 4R, 5R, 6aS)-2,3,3a, 6a-tetrahydro-5-hydroxy-4-[(3R)-3-hydroxy-4-(3-trifluoroemthylphenoxy)but-trans-enyl]-2-oxocyclopenteno[b]furan, identical except for optical activity with authentic material by the following criteria:
 a. thin layer chromatography as described in Example 5
 b. vapour phase chromatography as described in Example 5, the bis-trimethyl silyl derivative having retention time of 7.6 minutes on the SE 33 column and 7.9 minutes on the OV-1column.
 c. mass spectrum. The mass spectrum of the peak from the OV-1 column was identical with that of authentic racemic bis-trimethylsilyl derivative ($M^+ = 516$)

EXAMPLE 13

The process described in Example 12 was repeated using each of the cultures, and the procedure, described in Example 10. In each case, the product was shown to contain material identical with authentic racemic 2,3,3a$\beta$,6a$\beta$-tetrahydro-5$\alpha$-hydroxy-4$\beta$-[3-trifluoromethylphenoxy)but-1-trans-enyl]-2-oxocyclopenteno[b]furan by:
 a. thin layer chromatography of a 200$\mu$l. sample on a Kieselgel-F254 plate, and a 300$\mu$l. sample on a Kieselgel-F254 plate impregnated with silver nitrate as described in Example 5, the plates being run three times in ethyl acetate and sprayed with the ceric sulphate reagent (Example 3);
 b. vapour phase chromatography of the bistrimethylsilyl derivative, prepared from a 200$\mu$l, sample, on the SE 33 column described in Example 5.

What we claim is:

1. A reduction process for the manufacture of an optically active prostaglandin intermediate of the formula and absolute sterochemistry:

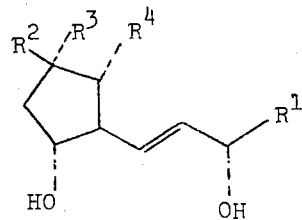

wherein $R^1$ is:
 branched or unbranched alkyl or alkenyl of 4 to 10 carbon atoms; a group of the formula $—A^1.OR^5$, wherein $A^1$ is alkylene of 1 to 9 carbon atoms and $R^5$ is alkyl of 1 to 9 carbon atoms or cycloalkyl of 5 to 7 carbon atoms, provided that $A^1$ and $R^5$ together contain not more than 10 carbon atoms; a group of the formula $-A^2R^6$, wherein $A^2$ is a direct bond or alkylene of 1 to 3 carbon atoms, and $R^6$ is aryl which is unsubstituted or which is substituted by halogen, nitro, alkyl, halogenoalkyl, or alkoxy each of 1 to 3 carbon atoms or dialkylamino wherein each alkyl is of 1 to 3 carbon atoms; a group of the formula $A^3.A^4.R^7$, wherein $A^3$ is alkylene of 1 to 3 carbon atoms bearing as substituents 0, 1 or 2 alkyls each of 1 to 3 carbon atoms, $A^4$ is oxygen, sulphur, sulphinyl or alkylamino of up to 4 carbon atoms, and $R^7$ is aryl, benzyl or furfuryl optionally substituted by hydroxy, nitro, phenyl, halogen, alkyl, alkenyl, halogenoalkyl, alkoxy, alkenyloxy, or acylamino of 1 to 4 carbon atoms or dialkylamino wherein each alkyl is of 1 to 3 carbon atoms; or a group of the formula $—A^3.A^5.R^8$, wherein $A^3$ has the meaning stated above, $A^5$ is oxygen, sulphur, sulphinyl, sulphonyl, imino or alkylimino of up to 4 carbon atoms or a direct bond, $A^3$ and $A^5$ are each a direct bond, and $R^8$ is an aroatic heterocyclyl of one or two 5- or 6-membered rings, containing in one ring only, 1 or 2 non adjacent nitrogen hetero atoms, and optionally bearing 1 to 3 alkyls or halogens as substituents; and either $R^2$ is hydrogen and $R^3$ and $R^4$ together with the two adjacent ring carbon atoms form a lactone ring of the formula:

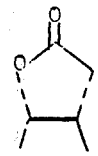

or $R^4$ is 6-carboxyhexyl or 6-carboxy-2-cis-hexenyl bearing 0 or 1 alkyl of 1 to 4 carbon atoms on carbon atom 4, 5 or 6 thereof, R is hydrogen and $R^3$ is hydroxy, or $R^2$ and $R^3$ together form oxo;
 which comprises culturing a micro-organism selected from a basidiomycete of the order Aphyllophorales, Agaricales or Dacrymycetales, a deuteromycete of the order Hyphommycetales and a blastomycete of the order Gryptococcales in the presence of a hydroxy-enone of the formula:

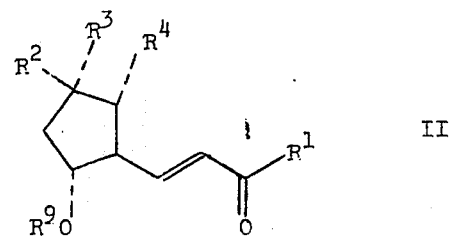

wherein $R^1$, $R^2$, $R^3$ and $R^4$ have the meanings stated above, and $R^9$ is a hydrogen atom or alkanoyl of up to 10 carbon atoms.

2. The process of claim 1 wherein in the starting material, $R^1$ is alkyl of 4 to 10 carbon atos, $R^2$ is hydrogen, $R^3$ and $R^4$ together with the two adjacent carbon atoms form a lactone ring as defined in claimm 1 and $R^9$ is hydrogen, wherein the micro-organism is selected from a basidiomycete of the genus Trechispora (=Sistotrema) or Lentinellus, or a blastommycete of the genus Brettanomyces.

3. The process of claim 2 wherein in the starting material R$^1$ is a n-pentyl or n-heptyl radical.

4. The process of claim 2 wherein the microorganism is selected from T.brinkmmannii (Bresadola) Rogers and Jackson, strain CMI 80,439, L.montanus (O.K. Miller), strain CBS 727,68, A.ellea (Vahlex Fries) Quelet, strain IMMI 180,725 and B. bruxellensis (Kuff and v. Laer), strain CBS 78.

5. The process of claim 1 wherein in the starting material, R$^1$ is a group —A$^3$.A$^4$.R$^7$ wherein A$^3$ is methylene, A$^4$ is oxygen and R$^7$ is aryl as defined in claim 1, R$^2$ is hydrogen, R$^3$ and R$^4$ together with the two adjacent carbons form a lactone ring as defined in claim 1, and R$^9$ is hydrogen, wherein the micro-organism is selected from a basidiomycete of the genus Trechispora (=Sistotrema), Armmillariella or Femsjonia, a deuteromycete of the genus Helicomyces or Ceratosporella, and a blastomycete of the genus Brettanommyces.

6. The process of claim 5 wherein in the starting material R$^1$ is 3-chlorophenyl or 3-trifluoromethylphenyl.

7. The process of claim 5 wherein the microorganis is selected microorganism T.brinkannii (Bresadola) Rogers and Jackson, strain CMI 80,439, T.niveo-creea (Höhnel and Litsch) Boidin, strains CBS 427,54 and 428,54, T.raduloides (Karst) Rogers, strain CBS 163,65, S.brinkmannii (Bresadola) J. Erikss, strains CBS 727,69, 154,38, 340,53, 341,53, 401,54, 402,54, 160,60, and 932,70, S.oblongisporu Christiansen and Hauerslev, strain CBS 397,63, A.mellea, strain IMI 180,725, F.luteo-alba Fr., strain CBS 209,48, H. Roseus Link, strain CBS 283,51, C. goidanichii Rammbelli, strain CBS 136,58 and B. bruxellensis (Kuff and v. Laer), strain CBS 78.

8. The process of claim 3 wherein the microorganism is selected from T.brinkmannii (Bresadola) Rogers and Jackson, strain CMI 80,439, L.montanus (O.K. Miller), strain CBS 727,68, A. Mellea (Vahlex Fries) Quélet, strain IMI 180,725 and B. bruxellensis (Kuff and v. Laer), strain CBS 78.

9. The process of claim 6 wherein the microorganism is selected from T.brinkmannii (Bresadola) Rogers and Jackson, strain CMI 80,439, T.niveo-cremea (Höhnel and Litsch) Boidin, strains CBS 427,54 and 428,54, T. raduloides (Karst) Rogers, strain CBS 163,65, S. brinkmannii (Bresadola) J. Erikss, strains CBS 727,69, 154,38, 340,53, 341,53, 401,54, 402,54, 160,60, and 932,70, S. oblongisporum Christiansen and Hauerslev, strain CBS 397,63, A.mellea, strain IMI 180,725, F.luteo-alba Fr., strain CBS 209,48, H. roseus Link, strain CBS 283,51, C.goidanicnii Rambelli, strain CBS 136,58 and B.bruxellensis (Kuff and v. Laer), strain CBS 78.

* * * * *